(12) United States Patent
Daenzer et al.

(10) Patent No.: US 6,805,637 B2
(45) Date of Patent: Oct. 19, 2004

(54) SHAFT ASSEMBLY WITH RECIRCULATING BALL ROLLER JOINT UNIT

(75) Inventors: Troy Daenzer, Reese, MI (US); Jesus Raul Garcia, Juarez (MX); Lorenzo Perea, Jr., El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/251,228

(22) Filed: Sep. 20, 2002

(65) Prior Publication Data

US 2004/0058738 A1 Mar. 25, 2004

(51) Int. Cl.⁷ .......................... F16C 3/035; F16D 3/06
(52) U.S. Cl. ....................................................... 464/168
(58) Field of Search ................................ 464/168, 167, 464/162, 906, 150, 152, 139, 141, 143, 146; 74/493, 492; 384/43

(56) References Cited

U.S. PATENT DOCUMENTS

| | | | |
|---|---|---|---|
| 2,791,894 A | * 5/1957 | Duckworth | ................. 464/168 |
| 3,800,558 A | * 4/1974 | Buthe et al. | ................. 464/168 |
| 4,165,195 A | * 8/1979 | Teramachi | ............... 403/359.5 |
| 4,406,502 A | * 9/1983 | Teramachi | ................... 384/45 |
| 4,509,386 A | * 4/1985 | Kimberlin | ..................... 74/492 |
| 5,613,780 A | * 3/1997 | Ng | ............................. 384/43 |
| 6,350,203 B1 | * 2/2002 | Zernickel | .................... 464/167 |
| 6,439,177 B2 | 8/2002 | Pierik | |
| 6,533,369 B2 | 3/2003 | Baumgartner et al. | |
| 6,582,313 B2 | 6/2003 | Perrow | |

* cited by examiner

*Primary Examiner*—Lynne H. Browne
*Assistant Examiner*—Kenn Thompson
(74) *Attorney, Agent, or Firm*—Michael D. Smith

(57) ABSTRACT

A shaft assembly with recirculating ball roller joint unit for use with an automotive steering column or the like has an inner shaft extending lengthwise within an outer shaft. A recirculating ball joint is provided between the shafts. The ball joint includes a shell assembly having two shells which together surround the inner shaft. Each shell has an outer cage, an inner cage and a retainer defining ball races, with balls recirculating in the races in rolling engagement with the inner shaft.

8 Claims, 4 Drawing Sheets

US 6,805,637 B2

SHAFT ASSEMBLY WITH RECIRCULATING BALL ROLLER JOINT UNIT

TECHNICAL FIELD

This invention relates generally to shaft assemblies and more particularly to a shaft assembly with recirculating ball roller joint unit.

BACKGROUND OF THE INVENTION

Shaft assemblies including relatively axially movable inner and outer shafts have many different functions, one being the transmission of torque in an automotive steering column. In a typical steering column, the shaft assembly may connect a steering shaft of the steering column to a steering gear and is often referred to as an intermediate shaft. A slip joint is usually provided between the shafts to facilitate relative axial movement.

One requirement of the joint is that its resistance to relative axial movement, commonly referred to as "slip load", be kept to a minimum so that the shafts may be put together easily at the point of manufacture to speed up production without raising ergonomic concerns. A low "slip load" is particularly important if the shaft assembly transmits torque as it is required to do when used with the steering column of an automotive vehicle. A low "slip load" also facilitates collapse of the steering column in the event of a head on collision.

Customers are demanding lower and lower "slip loads". However, it has been difficult to meet these demands with designs currently available.

SUMMARY OF THE INVENTION

In accordance with the present invention, a recirculating ball joint is provided to facilitate relative axial movement between an inner shaft and an outer shaft and is especially designed for use with the steering column of an automotive vehicle. The ball joint includes a shell assembly secured within the outer shaft and defining recirculation races for balls which have a rolling engagement with the inner shaft.

Preferably the shell assembly includes two shells, with the shells respectively extending about opposite sides of the inner shaft and together extending around the entire periphery of the inner shaft.

Preferably each shell comprises a radially inner cage, a radially outer cage, and a ball retainer between the cages. At least one closed circuit race is provided for each shell. An inner cage groove and an outer cage groove cooperate to define a portion only of the closed circuit race, leaving open a remaining portion thereof. The retainer has a retainer groove which cooperates with a longitudinally extending groove in the inner shaft to define the remaining portion of the closed circuit race. The balls are adapted to circulate in the closed circuit race to facilitate axial movement of the inner shaft relative to the outer shaft. Preferably each shell has two such closed circuit races with balls circulating in each.

One object of this invention is to provide a shaft assembly with a recirculating ball roller joint having the foregoing features and capabilities.

BRIEF DESCRIPTION OF THE DRAWINGS

The foregoing as well as other features, objects and advantages of this invention will become more apparent as the following description proceeds, especially when considered with the accompanying drawings, wherein.

BRIEF DESCRIPTION OF THE PREFERRED EMBODIMENT

Referring now more particularly to the drawings, there is shown a shaft assembly 10 including an elongated open-ended tubular outer shaft 12 and an elongated inner shaft 14 extending lengthwise within the outer shaft 12, with the longitudinal center line of the inner shaft coincident with that of the outer shaft. A recirculating ball roller joint 16 between the shafts enables relative axial shaft movement.

Figure 1:
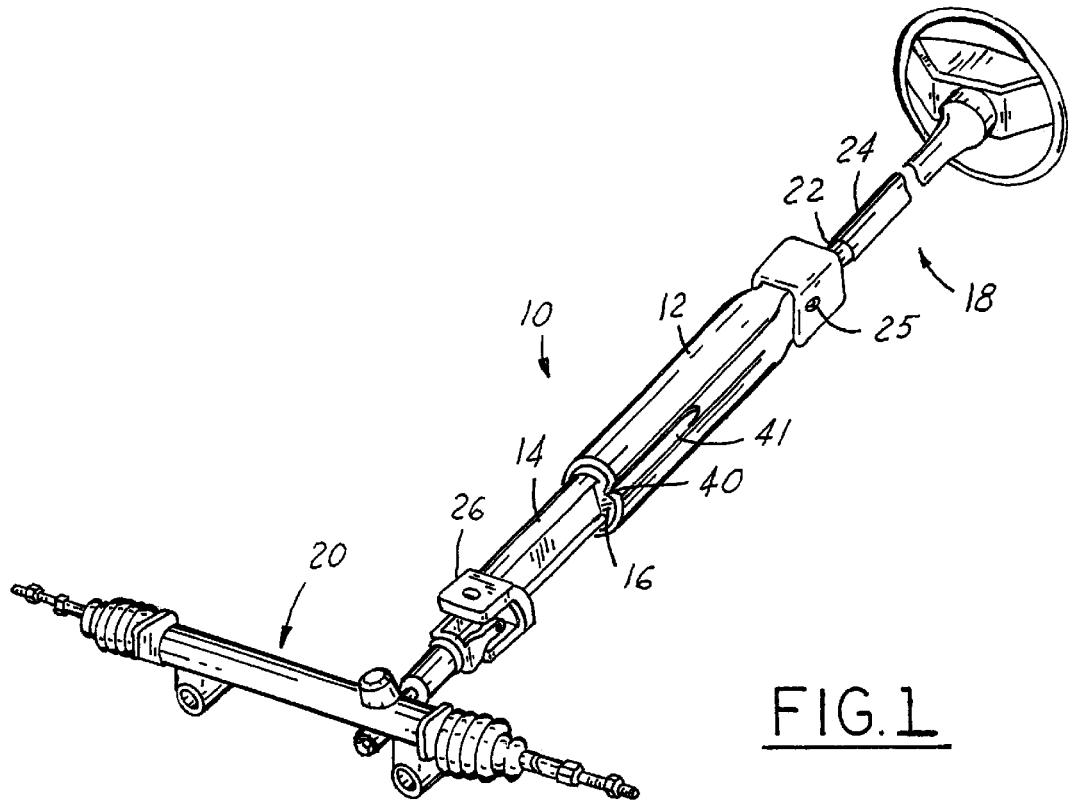
FIG. 1 is a perspective view, showing the shaft assembly with recirculating ball roller joint of this invention connecting a steering column to a steering gear of an automotive vehicle.
Figure 2:
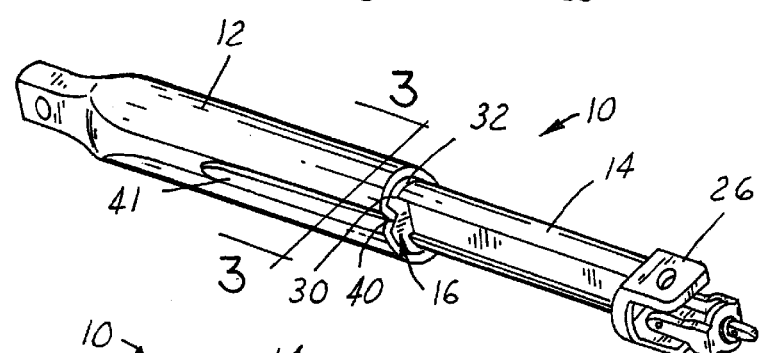
FIG. 2 is a perspective view of the shaft assembly.

FIG. 1 shows the shaft assembly 10 between a steering column 18 and a steering gear 20 of an automotive vehicle. In this environment, the assembly 10 is sometimes referred to as an intermediate shaft. The steering column 18 has a steering shaft 22 supported for rotation and axial movement within a tubular jacket 24. The front end of the steering shaft 22 is pivoted at 25 to the rear end of the outer shaft 12 of the shaft assembly 10, and the front end of the inner shaft 14 is connected to the steering gear 20 by a universal joint 26. The shaft assembly 10 as used in FIG. 1 adjusts for any possible misalignment between the steering column 18 and the steering gear 20.

The recirculating ball joint 16 includes a shell assembly 28 made up of two shells 30 and 32. The shells 30 and 32 are substantially identical so a description of one will suffice for both.

Figure 3:
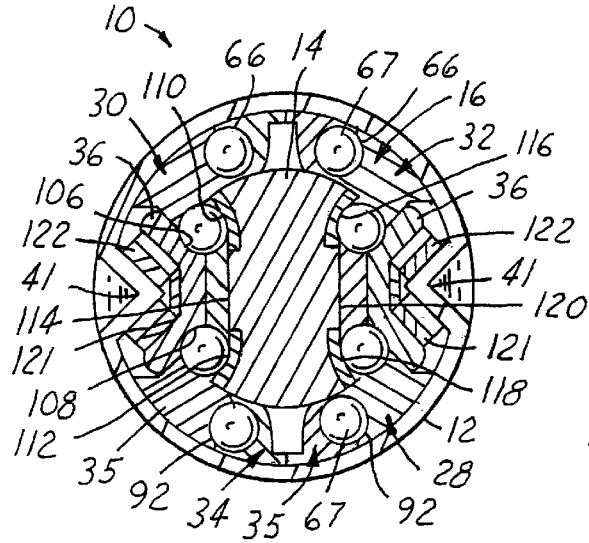
FIG. 3 is a sectional view taken on the line 3—3 in FIG. 2.
Figure 4:
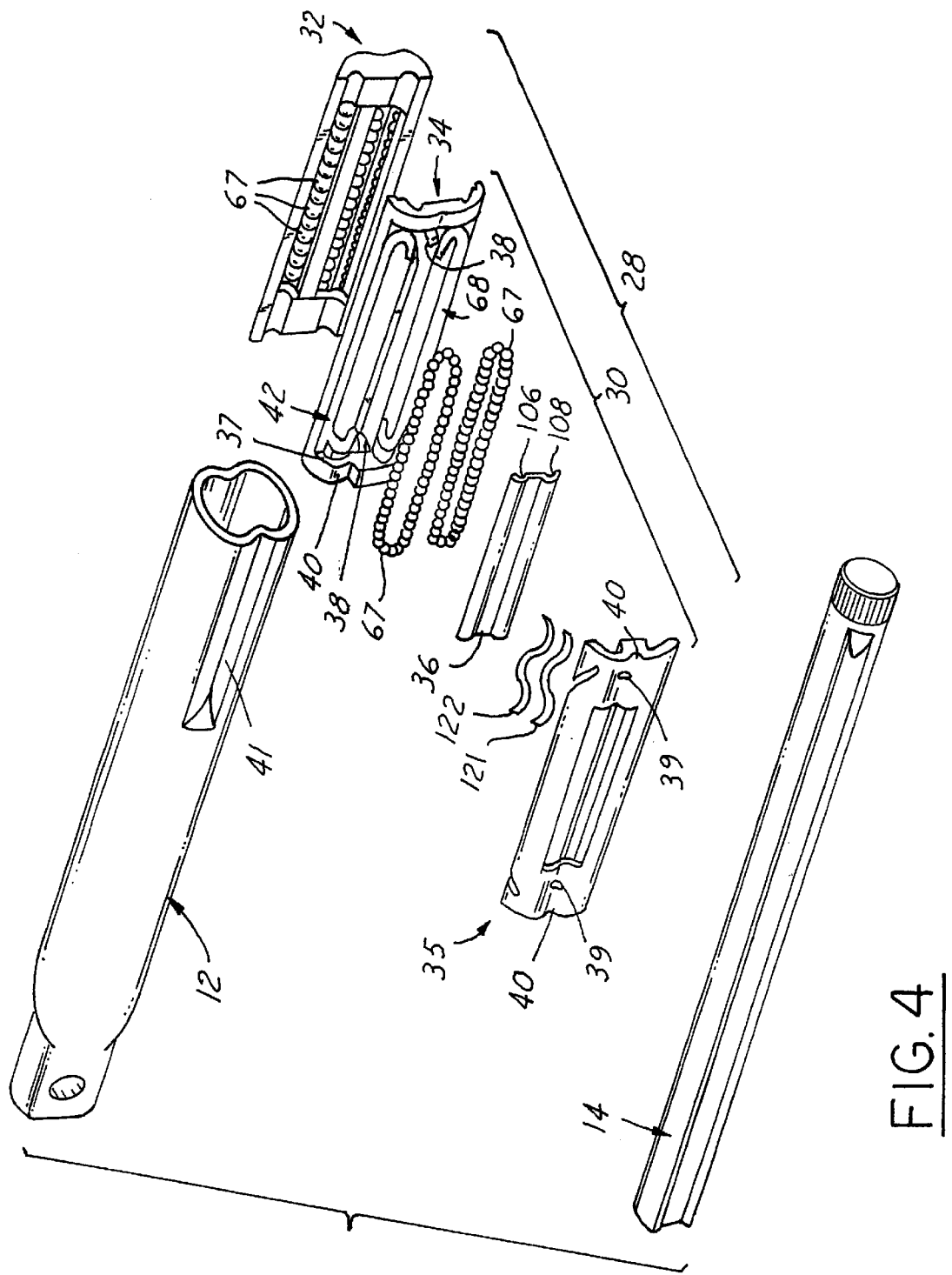
FIG. 4 is an exploded perspective view of the shaft assembly including the ball roller joint.
Figure 5:
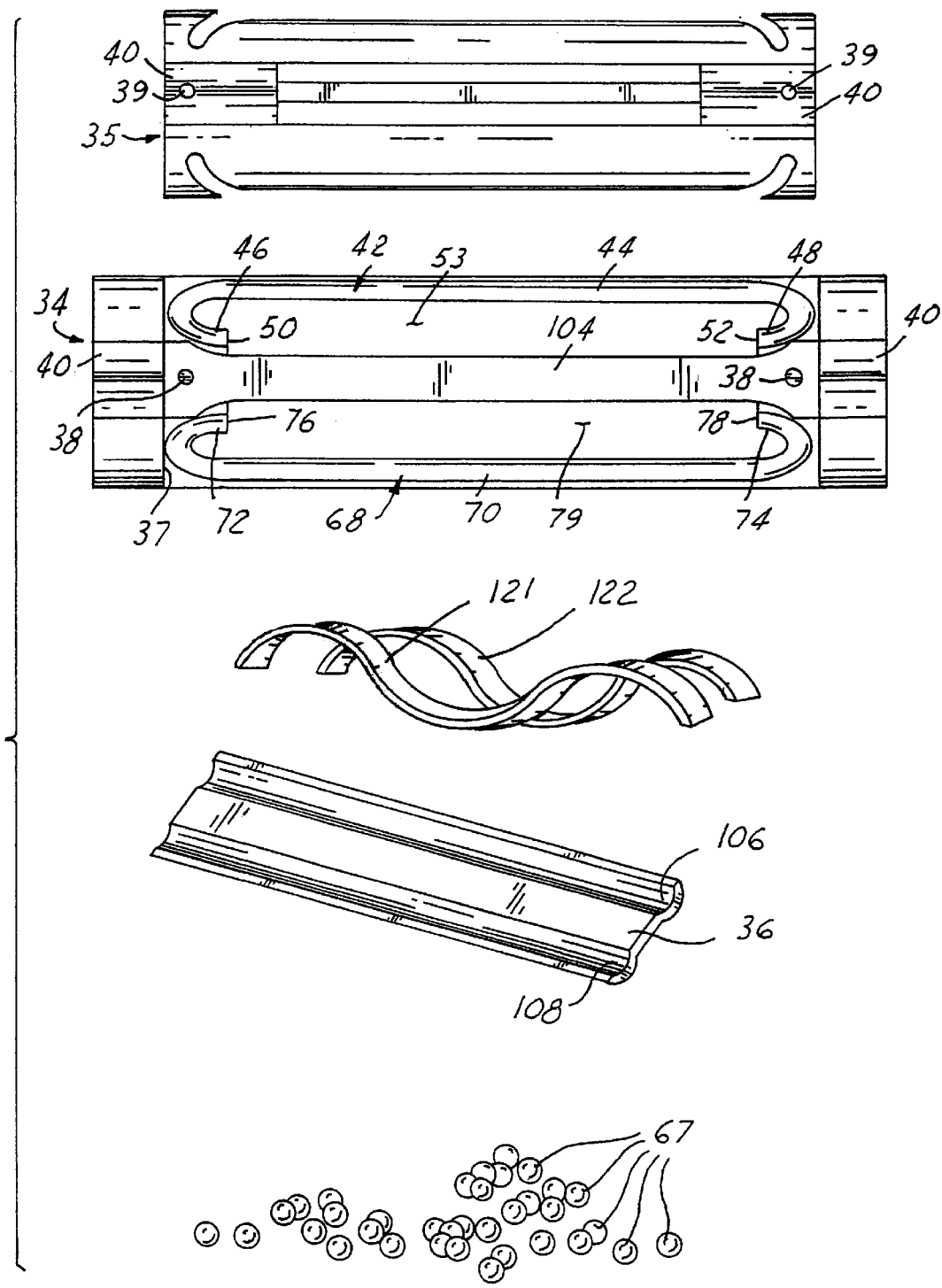
FIG. 5 is an exploded view showing an inner cage, an outer cage, springs, a ball retainer and balls of the ball roller joint.

Each shell has a radially inner cage 34, a radially outer cage 35 and a ball retainer 36 between the inner and outer cages. See FIGS. 3, 4 and 5. The inner and outer cages 34 and 35 are assembled together by fitting the outer cage 35 within a recess 37 in the radially outer surface of the inner cage. In this assembled relationship, the two cages are accurately located by locators in the form of pins 38 on the outer cage engaging in holes 39 in the inner cage. The radially outer surfaces of the inner and outer cages of both shells 30 and 32 have aligned grooves 40 which receive longitudinally extending radially inwardly offset ridges 41 in the outer shaft 12. The shells 30 and 32 are secured to the outer shaft 12 by any suitable means, as by welding or by a suitable adhesive, for example.

Figure 6A:
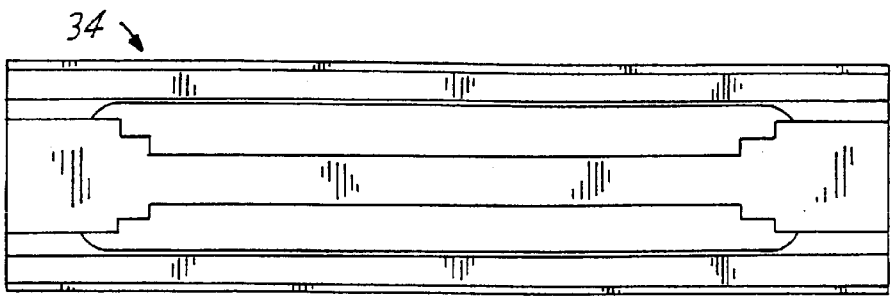
FIG. 6A is a view of the radially inner side of the inner cage of the ball roller joint.
Figure 6B:
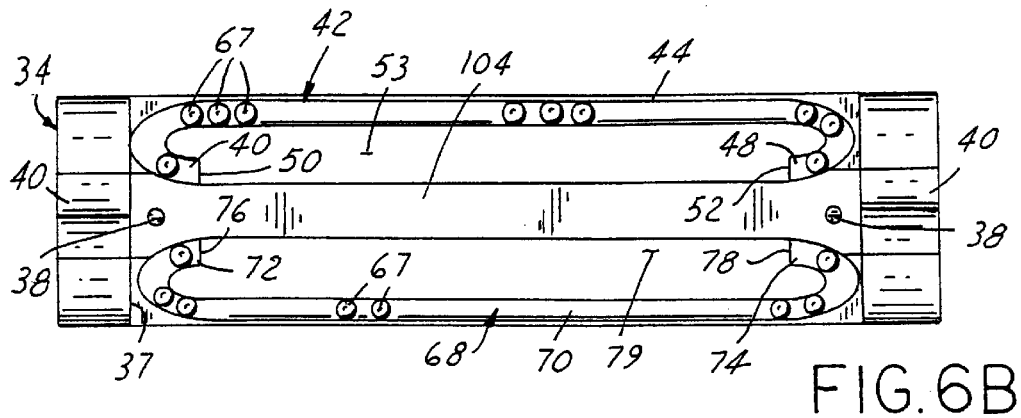
FIG. 6B is a view of the radially outer side of the inner cage of the ball roller joint.
Figure 7A:
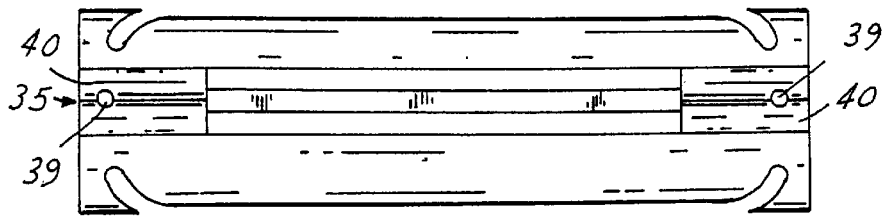
FIG. 7A is a view of the radially outer side of the outer cage of the ball roller joint.
Figure 7B:
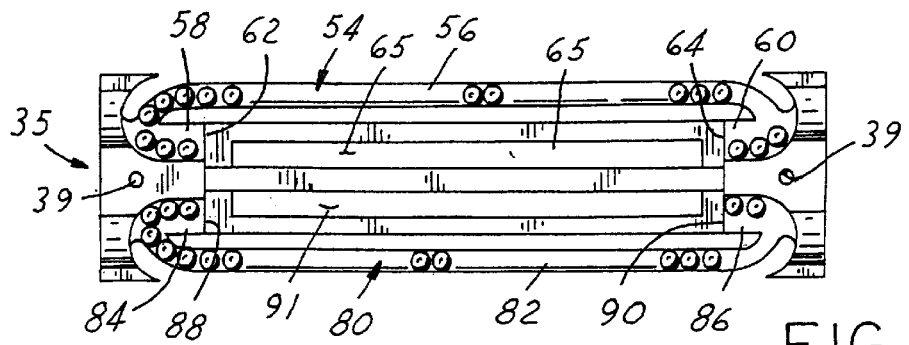
FIG. 7B is a view of the radially inner side of the outer cage of the ball roller joint.

A groove 42 is formed in the inner cage 34. See FIGS. 5 and 6B. The groove 42 has a mid-portion 44 that extends lengthwise of the inner cage 34 and at the ends is doubled back or return bent 180° to provide terminal portions 46 and 48 having spaced apart ends 50 and 52 leaving a gap 53 between the ends. A groove 54 is formed in the outer cage 35. See FIG. 7B. The groove 54 has a mid-portion 56 that extends lengthwise of the outer cage and at the ends is doubled back or return bent 180° to provide terminal portions 58 and 60 having spaced apart ends 62 and 64 leaving a gap 65 between the ends. When the inner and outer cages 34 and 35 are assembled together, the mid-portions and terminal portions of the grooves 42 and 54 of the inner and outer cages are directly opposed to one another to define a portion only of a closed circuit ball race 66 for the recirculation of a plurality of balls 67.

The radially inner cage 34 has a second groove 68. See FIGS. 5 and 6B. The groove 68 has a mid-portion 70 that extends lengthwise of the inner cage 34 and at the ends is doubled back or return bent 180° to provide terminal portions 72 and 74 having spaced apart ends 76 and 78 leaving a gap 79 between the ends. The outer cage 35 has a groove 80. See FIG. 7B. The groove 80 has a mid-portion 82 that extends lengthwise of the outer cage 35 and at the ends is doubled back or return bent 180° to provide terminal portions 84 and 86 having spaced apart ends 88 and 90 leaving a gap 91 between the ends. The mid-portions and terminal portions of the grooves 68 and 80 in the inner and outer cages are directly opposed to one another to define a portion only of a second closed circuit ball race 92, also for the recirculation of other balls 67.

The gap 53 between the ends 50, 52 of the groove 42 of the inner cage 34 and the gap 79 between the ends 76, 78 of the groove 68 of the inner cage 34 are separated by a bar 104 which extends lengthwise of the inner cage.

The ball retainer 36 has a mid-section which rests upon the bar 104 and curved wings on opposite sides of the mid-section shaped to form grooves 106 and 108 which are disposed respectively in the gap 65 between the ends 62 and 64 of the groove 54 in the outer cage 35 and the gap 91 between the ends 88 and 90 of the groove 80 in the outer cage. See FIG. 3.

The inner shaft 14 has a pair of longitudinally extending circumferentially spaced apart grooves 110 and 112 on one side separated by a flat surface 114, and a pair of longitudinally extending circumferentially spaced apart grooves 116 and 118 on the opposite side of the inner shaft separated by a second flat surface 120 which is parallel to the flat surface 114.

Referring to the shell 30, the retainer groove 106 of the retainer 36 and the inner shaft groove 110 cooperate to close an open portion of the closed circuit ball race 66 between the groove ends 50, 52 of the groove 42 of the inner cage 34 and the groove ends 62, 64 of the groove 54 of the outer cage 35. The retainer groove 108 of the retainer 36 and the inner shaft groove 112 cooperate to close the open portion of the closed circuit ball race 92 between the groove ends 76, 78 of the groove 68 of the inner cage 34 and the groove ends 88, 90 of the groove 80, of the outer cage 35.

Springs 121 and 122 are provided between the inner and outer cages 34 and 35. The springs 121 and 122 press the ball retainer 36 radially inwardly and the ball retainer presses the balls 67 in ball races 66 and 92 radially inwardly through the gaps 53 and 65 and hold them against the inner shaft grooves 110 and 112.

Referring to the shell 32, the retainer grooves 106 and 108 cooperate with the inner shaft grooves 116 and 118 to close the open portion of the closed circuit ball races 66 and 92 in the same manner as described in connection with the shell 30.

The balls 67 in the ball races 66 and 92 of the two shells 30 and 32 project though the gaps 53 and 65 and have a rolling engagement with the grooves 110, 112, 116, and 118 of the inner shaft 14 to facilitate axial movement of the inner shaft 14 relative to the outer shaft 12.

What is claimed is:

1. A shaft assembly with recirculating ball roller joint unit for use with an automotive steering column or the like comprising:

an elongated tubular outer shaft, an elongated inner shaft extending lengthwise within the outer shaft, and a recirculating ball joint enabling relative axial movement between said shafts, said ball joint comprising a shell assembly secured within the outer shaft and surrounding said inner shaft, said shell assembly and said inner shaft defining closed circuit ball races, balls in said ball races in rolling engagement with the inner shaft wherein said shell assembly comprises two shells, said shells respectively extending about opposite peripheral portions of the inner shaft and both of said shells together extending about an entire periphery of the inner shaft, wherein the closed circuit ball races include a first closed circuit ball race and each of said shells comprises:

a radially inner cage, a radially outer cage, and a ball retainer between said cages, a first inner cage groove in said inner cage and a first outer cage groove in said outer cage, the first inner cage groove and the first outer cage groove cooperating to define a portion only of the first closed circuit race leaving open a remaining portion of the first closed circuit race, the retainer having a first retainer groove, said inner shaft having a first longitudinally extending inner shaft groove, and said first retainer groove and said first inner shaft groove cooperating to close the remaining portion of the first closed circuit race.

2. The shaft assembly with recirculating ball roller joint unit of claim 1, wherein the closed circuit ball races include a second closed circuit ball race and each of said shells further comprises:

a second inner cage groove in said inner cage and a second outer cage groove in said outer cage, the second inner cage groove and the second outer cage groove cooperating to define a portion only of the second closed circuit race leaving open a remaining portion of the second closed circuit race, the retainer having a second retainer groove, said inner shaft having a second longitudinally extending inner shaft groove, and said second retainer groove and said second inner shaft groove cooperating to close the remaining portion of the second closed circuit race.

3. The shaft assembly with recirculating ball roller joint unit of claim 2, wherein the first and second longitudinally extending inner shaft grooves cooperating with the respective first and second retainer grooves to define the remaining portions of the first and second closed circuit races of one of said shells are circumferentially spaced apart on one side of the inner shaft and are separated by a first flat surface, the first and second longitudinally extending inner shaft grooves cooperating with the respective first and second retainer grooves to define the remaining portions of the first and second closed circuit races of the other of said shells are circumferentially spaced apart on an opposite side of the inner shaft and are separated by a second flat surface, and said flat surfaces are parallel to one another.

4. The shaft assembly with recirculating ball roller joint unit of claim 3, further including means for urging the retainer in each of said shells against the balls in said first and second closed circuit races thereof to hold said balls in rolling engagement with the first and second inner shaft grooves.

5. The shaft assembly with recirculating ball roller joint unit of claim 4, wherein the means for urging said retainer includes a spring between the retainer and the outer cage of each of said shells.

6. The shaft assembly with recirculating ball roller joint unit of claim 5, further including locators for locating said outer cage relative to said inner cage of each of said shells in an assembled relationship.

7. The shaft assembly with recirculating ball roller joint unit of claim 6, wherein said locators include pins on one of said cages engagable in holes in the other of said cages of each of said shells.

8. A shaft assembly with recirculating ball roller joint unit for use with an automotive steering column or the like comprising:

an elongated tubular outer shaft, an elongated inner shaft extending lengthwise within the outer shaft, and a recirculating ball joint enabling relative axial movement between said shafts, said ball joint comprising a shell assembly including two shells secured within the outer shaft and surrounding said inner shaft, said shell assembly and said inner shaft defining closed circuit ball races, balls in said ball races in rolling engagement with the inner shaft;

where the closed circuit ball races include a first closed circuit ball race and said shells comprise:

a radially inner cage, a radially outer cage, and a ball retainer between said cages, a first inner cage groove in said inner cage and a first outer cage groove in said outer cage, the first inner cage groove and the first outer cage groove cooperating to define a portion only of the first closed circuit race leaving open a remaining portion of the first closed circuit race, the retainer having a first retainer groove, said inner shaft having a first longitudinally extending inner shaft groove, and said first retainer groove and said first inner shaft groove cooperating to close the remaining portion of the first closed circuit race.

* * * * *